July 1, 1930.   P. ORZEL   1,768,857
TEMPLATE HOLDING STAND FOR USE WITH CUTTING TORCHES
Filed Feb. 10, 1926   2 Sheets-Sheet 2
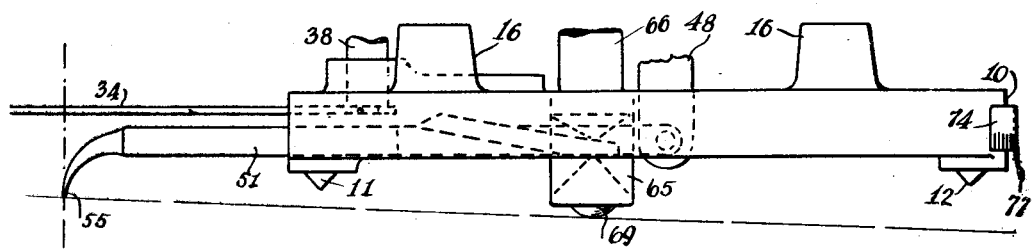
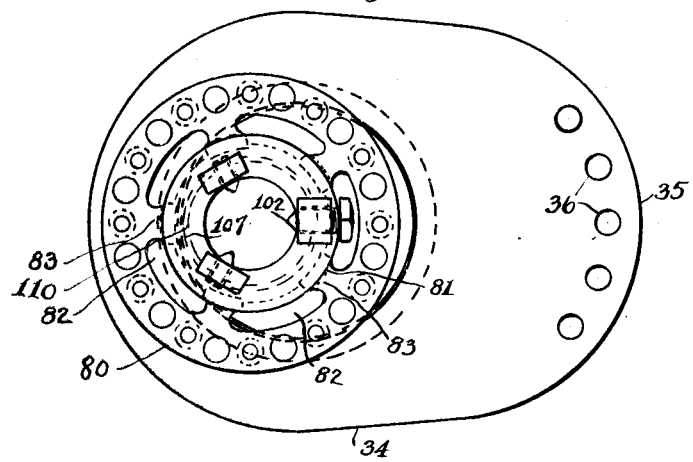
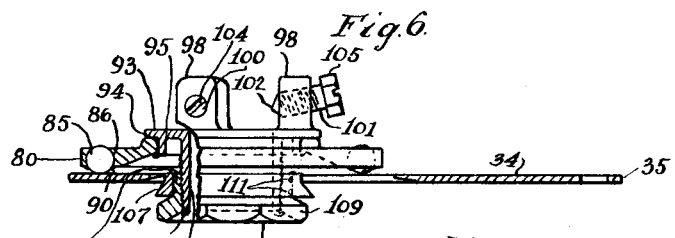
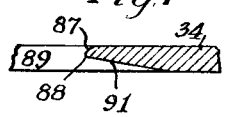
INVENTOR
Paul Orzel
BY
Harold D. Penney ATTORNEY Patented July 1, 1930

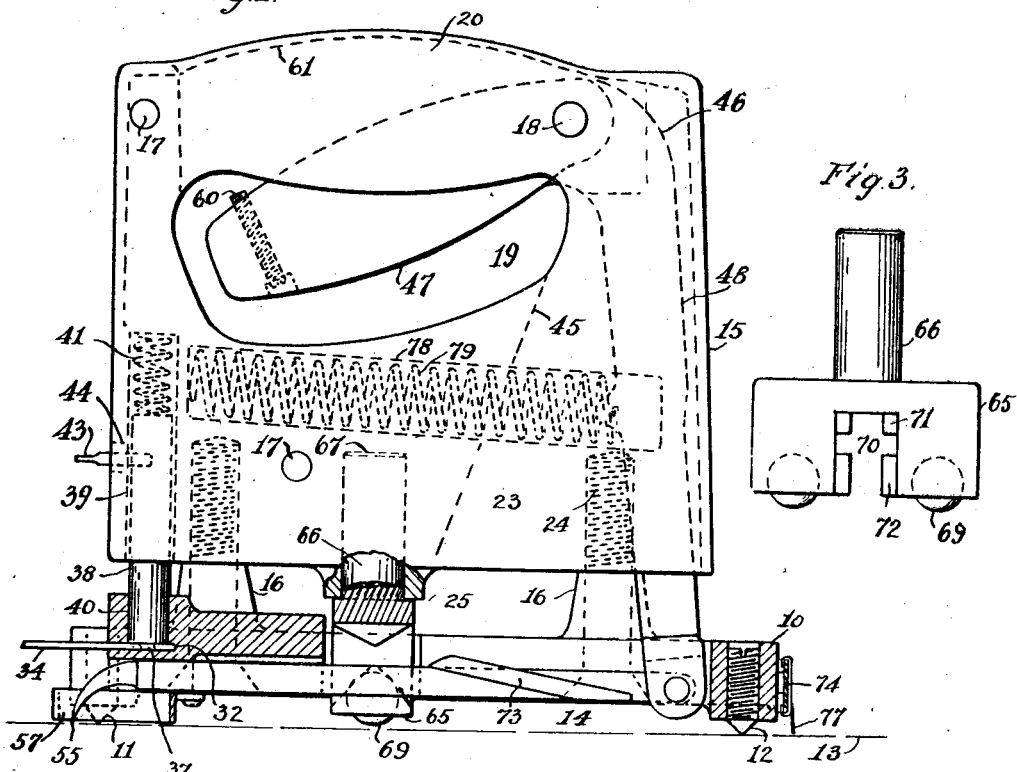

1,768,857

UNITED STATES PATENT OFFICE

PAUL ORZEL, OF NEW YORK, N. Y.

TEMPLATE-HOLDING STAND FOR USE WITH CUTTING TORCHES

Application filed February 10, 1926. Serial No. 87,470.

This invention relates to template-stands for holding templates for guiding metal-cutting blow torches and more particularly to hand controlled devices, though it is noted that the invention is not limited to hand stands, nor torch guiding templates, nor in some respects even to template stands.

One object of the invention is to provide an apparatus or device of this kind well protected from flame, slag and excessive heat.

Another object of the invention is to provide an apparatus or device of this kind which may be easily, quickly and accurately positioned relative to a work piece.

Another object of the invention is to provide, for an apparatus or device of this kind, an improved torch holding means and an improved template and template holding means.

Other objects of the invention are to improve generally the simplicity and efficiency of such devices and to provide a device or apparatus of this kind which is economical, durable and reliable in operation, and economical to manufacture.

Still other objects of the invention will appear as the description proceeds; and while herein details of the invention are described and claimed, the invention is not limited to these, since many and various changes may be made without departing from the scope of the invention as claimed in the broader claims.

The inventive features for the accomplishment of these and other objects are shown herein in connection with an improved template holder which, briefly stated, includes a standard carried on a template carrying base and formed with a handle opening and a cavity receiving an elbow lever comprising a handle portion in the handle opening, and a downturned arm to which is pivoted a finder bar slidable in said base and provided with a finder point at the forward end whereby when the handle portion is raised the finder bar is projected. A yoke vertically slidable in said base and having lower antifriction bearings is engaged by cams on said bar whereby when said handle is raised said yoke is lowered and the holder supported on the bearings for easily moving the holder to positions as indicated by the finder bar. A ring disposable over the template carries a sleeve receiving a blow pipe torch. A nut on said sleeve carries a coned collar engageable with the template edge, whereby when the nut is moved up or down the distance of the blow pipe from the template edge may be adjusted.

In the accompanying drawings, showing by way of example, one of many possible embodiments of the invention, Fig. 1 is a fragmental side elevation, partly in central vertical section, showing the assembled and positioned holder;

Fig. 2 is a fragmental bottom plan showing the holder and template;

Fig. 3 is a front or rear elevation of the lifting yoke;

Fig. 4 is a fragmental side elevation showing the holder base riding on the positioning yoke;

Fig. 5 is a plan showing a template and the blow-pipe-carrying means resting thereon;

Fig. 6 is a central longitudinal vertical sectional view, partly in elevation, showing the blow-pipe carrying means resting on the template; and Fig. 7 is a fragmental transverse vertical sectional view through the guiding edge of the template.

The various parts of my improved template holder are carried on or by an elongated base 10 provided at the forward corners and the middle of the rear end with vertical tapped bores receiving downwardly projected and pointed bearing screws 11 and 12 supporting the base on the work piece 13 to furnish a three point bearing to hold the holder against lateral slipping and to hold the base spaced from the work piece to furnish air space 14 therebetween.

A handle or holder standard 15 resting on bosses 16 on the base 10 comprises right and left halves riveted together at the mid longitudinal plane of the holder, by rivets 17 and 18, and formed with a large elongated transverse handle opening 19 forming a handle 20 at the upper part. The wide heavy lower portion 23 of the standard is provided with threaded bores receiving screws 24 passed through said bosses 16 for holding the standard spaced above the base to furnish another air space 25 between the base and standard.

Said base is provided with a concave front face 28 (Fig. 2) having slightly forwardly projecting end lugs 29 and a central lug 30, all provided with deep template receiving slots 31, 32 all in the same horizontal plane, receiving a template 34 provided with an arcuate rear portion 35 received in said slots, whereby the template is disposed close to the work piece to deflect the slag, said rear edge being provided with a plurality of vent and locating openings 36 adapted to receive the lower reduced end 37 (Fig. 1) of a bolt 38 in the vertical bolt bore 39 in the standard 40 in the lug 30. Said reduced end is surrounded by a lower shoulder pressed against the template by a spring 41 compressed between the upper end of the upper bore 39 and the end of the bolt. A handle 43 carried by said bolt projects through a slot 44 in the holder, whereby the bolt may be easily raised and the template easily removed.

Said holder standard 15 is provided at its mid longitudinal plane with an elbow shaped cavity 45 above and behind and communicating with the handle opening 19 and receiving an elbow lever 46 pivoted on the rivet 18 at its elbow part in the elbow part of the cavity and having a forward handle end 47 normally disposed in the upper part of the handle opening, and a downturned arm 48 normally disposed in the rear part of the elbow shaped cavity.

Said base 10 is provided with an axially disposed cross-shaped slot 50 passing therethrough receiving said lower arm 48 and a finder bar 51 loosely disposed in said slot and pivoted at the rear end between ears 52 of said bar and having its forward part slidably received in a slide recess 53 in the lower part of said central lug 30 and provided with a downturned finder point 55. An arcuate flame deflector 57 disposed across said concaved end face 28 and extending substantially to the work piece 13 holds said finder bar in the recess 53 and is provided with rearturned ears 58 whereby the deflector is secured to the bottom face of said base 10. A set screw 60 passed upwardly through the handle portion 47 and engageable with the top wall 61 of said cavity adjustably limits upward movement of the handle portion, thereby to accurately locate the forward limit of the finder pointer to indicate the center of the hole to be cut.

A yoke 65 located in the cross arms 68 (Fig. 2) of the cross-shaped slot and provided with an upstanding guide plunger 66 receivable in a bore 67 (Fig. 1) of the holder upright 15, is provided at the ends with downwardly opening socket recesses in which are loosely retained antifriction bearing balls 69 for at times supporting the holder on the work piece, as will be explained. Said yoke is also provided with a downwardly opening transverse groove 70 (Fig. 3) slidably receiving the finder bar 51, the side walls of the groove each being provided with a pair of spaced guide lugs 71 and 72 one above the other between which engages forwardly upwardly inclined cam ribs 73 on the sides of said bar, whereby when said handle portion is raised and the finder bar is forced forward said yoke is lowered relative to the holder, thus raising the holder and the pointed bearing screws from the work piece, permitting the easy positioning of the holder by rolling it on the balls 69 while the finder point is projected to find the center or other locating mark.

The finder point 55 and the point of the rearmost bearing screw 12 both being in the same median vertical plane of the holder serve to locate the template directly over the center or other locating line of a hole to be cut, as when the finder point cannot reach the center or when the template must the accurately angularly located.

For setting the device in advance for properly locating the template for cutting elongated or other non-circular template openings or edges at a determined angle relative to said locating line, particularly when a large number of similarly located cuttings are to be made, I provide a horizontally disposed arcuate graduated plate 74 held by countersunk screws 75, on the rear of said stand, passing through spacing tubes 76 holding the plate concentric with said finder point 55 when the latter is at its forward limit of movement, and a downwardly pointing pointer 77 slidable on said plate whereby said stand may be set at a determined angle relative to a locating line drawn on a work piece.

An approximately horizontal guide channel 78 (Fig. 1) provided in said holder below the handle opening receives a spring 79 compressed between said downturned end 48 and the forward end of the guide channels, whereby the spring and the weight of said handle portion 47 yieldably restore or hold the finder bar and the yoke 65 retracted to house the finder bar and to cause the holder to rest on said bearing points 11 and 12.

The blow-torch carrying means includes a stabilizer ring 80 (Figs. 5 and 6) disposable over said template and provided centrally with a large hub receiving opening 81 having an edge portion of partial circular cross section surrounded by heat insulating and ventilating openings 82 (Fig. 5), the edge being cut away as at 84 to form wide supporting bearing projections 83 therebetween. Balls 85 (Fig. 6) in the ball receiving openings 86 project at the bottom to engage the template at a minimum number of points to support the ring spaced above the template, the balls being adapted to reduce friction and clear oxidation and ride upon the upper beveled face 87 (Fig. 7) of the edge 88 template opening 89, at least three balls always engaging the template. The upper part of the ball receiving socket openings engage over the ball except at the top, the lower edge of the bearing opening being upset or swedged over, as at 90, to retain the balls.

The template opening 89 is bounded by upper and lower beveled faces 87 and 91 to form a relatively sharp template or guide edge 88 to prevent the adherence of slag, such as would cause inaccuracy in the guiding, the upper face 87 causing the balls 85 to ride easily over the edge, the lower beveled face deflecting the slag.

A torch-receiving hub 93 is rotatably received in said hub receiving opening 81, is provided with a lateral flange 94 and a downturned flange 95 tangentially engaging said edge portion of the hub receiving opening, and is provided with a downwardly extending exteriorly threaded torch receiving sleeve 96 having an outwardly turned lower retaining edge 97 and a plurality of upwardly extending lugs 98 placed equal angles apart around the torch and provided with inwardly and slightly downwardly tapped bores pointing toward the axis of the torch receiving set screws 100 and 101 having pointed inner ends 102 for engaging and holding torches of different size and shape, two of the screws 100 having bit receiving slots 104, whereby they may be more or less permanently and accurately adjusted and the torch accurately positioned, the other set screw having a wrench receiving head 105 for quickly releasing or securing the torch.

The bearing faces of the projections 83 are reduced in area by the cut away part at 84, thus to reduce friction to make rotation of the hub 93 easier. The projections 83 also serve to clean the flanges 94 and 95 of slag.

An exteriorly slightly coned or beveled roller collar 107 engageable with the edge 88 is rotatably received on an adjusting bearing nut 108 received on said sleeve 96 and retained by said outwardly turned edge 97 and provided at the lower edge with a beveled slag-deflecting octagonal wrench-receiving flange 109 and at the upper edge with a slightly out-turned flange 110, the two flanges serving to retain the collar. The lower conical face of the flange 109 serves to deflect the slag away from the template edge 88 as an additional precaution against the adherence of slag to said edge. Between the flanges 109 and 110, the sleeve is provided with a plurality of annular friction-reducing grooves 111 to reduce friction and oxidation.

Said collar is adjustable up or down by rotaton of the nut 108, to adjust the distance of the axis of the flame from said template edge, to compensate for the different width of cut for different metals and effectiveness of fuels.

The operation of the device is very simple. The bolts 38 being raised, the desired template 34 is inserted in the slots 31 and 32 (Fig. 2) and the reduced end 37 engaged in the desired hole 36 to locate the template relative to the holder.

The handle 47 is raised in order to project the finder point 55 and raise the holder on the balls 69 (Fig. 4), after which the holder may be easily moved until the point 55 is over the center or other mark of the hole to be cut, or until the points 55 and 12 are located on a center or other locating line on the work piece. Then the handle 49 is released under the action of the spring 76 and the weight of the handle 47, thus housing the finder bar 51 and lowering the holder on the three sharp points 11 and 12, whereupon the holder is ready for use.

The required blow torch is inserted in the sleeve 97 (Fig. 6) and alined and secured therein by adjusting the set screws 100 and 101. The nut 108 is adjusted to place the active line of the coned collar 107 proper distance from the edge 88 (Fig. 7) depending upon the width of the cut, and the stabilizing ring 80 is then ready for use.

The ring 80 is placed relative to the template and the edge 88 as shown in Fig. 6 and the blow torch guided entirely around the guide edge of the template, thus cutting the work piece in conformity to the selected tempate.

During the cutting operation, the flame deflector 57 prevents the entrance of flame and slag into the air space 14 (Fig. 1), while the air spaces 14 and 25 insulate the holder upright 15 from the heat of the flame and the work piece. The edge 97 (Fig. 6), the flange 108 and the lower level 91 also serve to deflect flame and slag, the recesses 82 and alternate openings 110 (Fig. 5) furnish ventilation.

I claim as my invention:

1. A template holder comprising a base; means holding the base spaced from a work piece; a standard carried on said base and spaced therefrom to form an air space therebetween; and a template carried by the holder.

2. In combination, a base provided near the corners with high bosses; a handle-carrying standard carried spaced from said base and having a wide lower portion mounted on said bosses; and a guide carried by the base.

3. In combination, an elongated base provided at the forward corners and the middle of the rear end with vertical tapped bores; downwardly projected and pointed bearing screws in said bores supporting the base and holding it against lateral slipping and holding the base spaced from the work piece to furnish air space therebetween; a handle-carrying standard on the base; and a guide carried by the base.

4. In combination, a base; means holding the base spaced from a work piece; a standard carried on said base and spaced therefrom; and a template carried by the base.

5. In combination, an elongated stand; downwardly projected bearing points at the forward corners and the middle of the rear end supporting the stand and to furnish a three point bearing for the stand; and a template carried by the stand.

6. In combination, a base; a stand carried on said base and having a wide heavy lower part; and a template carried by the base.

7. In combination, a base having bosses thereon; a handle or holder standard resting on said bosses and comprising right and left halves riveted together at the mid longitudinal plane of the holder and formed with an elongated transverse handle opening forming a handle at the upper part; said holder being provided at its mid plane with an elbow shaped cavity above and behind and communicating with the handle opening; an elbow lever pivoted at its elbow part on one of the rivets in the elbow part of the cavity and having a forward handle end normally disposed in the upper part of the handle opening, and a downturned arm normally disposed in the rear part of the cavity; and a movable finder operated by said arm.

8. In combination, a template stand having a base provided with a concaved front face provided at the forward end with corner lugs and a central lug all provided with slots, the central lug having a vertical bore; a template provided with an arcuate rear portion received in said slots and provided with a plurality of locating and vent openings; and holding means engageable in said openings.

9. A template provided with an arcuate edge portion provided with a plurality of locating and vent openings.

10. In combination, a template stand having a base provided with a slot and an intersecting bore; a template received in said slot and provided with an opening; and a bolt engageable in said opening.

11. In combination, a template stand provided with corner lugs and a central lug all provided with slots, the central lug having a vertical bore; a template received in said slots and provided with locating openings; a bolt in said bore having a reduced end engageable in said opening; a spring pressing said bolt against the template; and a handle for retracting the bolt.

12. A tool stand comprising a base; a standard carried on said base and formed with a cavity and a handle opening; a tool carried at the forward end of the base; an elbow lever in the cavity and having a handle in the handle opening, and a downturned arm; and a finder bar pivoted to said arm and slidable in said base and provided with a finder point at the forward end.

13. In combination, a template stand; an elbow lever pivoted on the stand and comprising a weighted arm forming a handle and a downward disposed arm; and a movable finder operatively connected to the last named arm.

14. In combination, a template stand; a movable handle thereon; a movable finder operatively connected to the handle to be projected thereby; and a spring for restoring the finder.

15. In combination, a template stand; a movable handle thereon; a movable finder operatively connected to the handle whereby the finder is projected when the handle is raised; and means including a set screw for accurately limiting the upward movement of the handle.

16. In combination, a template stand; a movable anti-friction supporting device carried by said stand; and means for rendering the device operative to elevate said stand.

17. In combination, a tool stand; a movable anti-friction supporting device carried by said stand; and a handle operatively connected to the device for lowering the latter.

18. In combination, a base; a holder thereon provided with a cavity; and a transverse handle opening; an elbow lever pivoted in the cavity and having a handle in the handle opening, and a downturned arm in the rear part of the cavity; said base being provided with an axially disposed cross-shaped slot; a finder bar in said slot and pivoted at the rear end to said arm and having its forward part slideable in said recess and provided with a finder point; a yoke in the cross arms of the slot and provided with recesses and a transverse groove each side wall of which is provided with guide lugs one above the other; balls loosely retained in said recesses; cam ribs on said bar engaging between said lugs, whereby when said handle is raised said yoke is lowered; a spring compressed against said downturned arm to yieldably restore the finder bar to cause the holder to rest on said points; and a guide carried by said base.

19. In combination, a template stand; a movable anti-friction supporting device carried by said stand; a handle operatively connected to the device for lowering the device; and bearing balls carried in the lower part of the device.

20. In combination, a base carrying a standard; a template carried by the base; a lever on the standard having a handle; a finder bar connected to said lever and movable in said base; a vertically movable yoke slidable in said base; means on said bar engaging said yoke whereby said yoke is lowered; and means disposable on said template for carrying a blow torch.

21. In combination, a template; a lever on the stand having a handle; a finder bar connected to said lever and movable in said stand; a vertically movable yoke slidable in said stand and carrying anti-friction means; and means on said bar engaging said yoke whereby said yoke is lowered and the stand supported on the anti-friction means.

22. In combination, a template; a lever on the stand having a handle; a finder bar connected to said lever and movable in said stand; a vertically movable yoke slidable in said stand and carrying anti-friction means; and cam ribs on said bar engaging said yoke whereby said yoke is lowered and the stand supported on the anti-friction means.

23. In combination, a template stand having a base; means holding the base spaced from a work piece; a flame deflector carried on and projecting below said face; and a movable finder slidable in the base and in part supported by said deflector.

24. In combination, an elongated template stand; supporting means for said stand including a downwardly projected bearing point at the middle of the rear end of the stand; a finder bar longitudinally slidable in said stand in the same median vertical plane with said bearing point and provided with a finder point also in said plane.

25. A stabilizer ring disposable over a template and provided centrally with a large hub receiving opening surrounded by heat insulating and ventilating recesses forming wide bearing projections therebetween; and a torch carrying hub in said opening.

26. In combination, a ring disposable over a template and having a central opening; a torch receiving hub rotatably received in said opening and provided with a lateral flange resting on the ring and a downturned flange engaging in the opening.

27. In combination, a template; and a ring disposable over said template and carrying a blow torch receiving sleeve having a slag deflector at the lower end.

28. In combination, a template stand; a template thereon; a stabilizing ring; bearing balls in the ring to engage the template; a hub received in said ring and provided with an exteriorly threaded torch receiving sleeve; a nut on said sleeve; and an exteriorly coned collar on said nut engageable with the template.

29. In combination, a ring disposable over a template; a blow torch receiving hub including a sleeve having a slag deflector at the lower end, said hub being provided with upwardly extending lugs placed around the torch and provided with tapped bores pointing toward the axis of the torch; set screws in said bores having pointing inner ends for engaging and holding torches of different size and shape.

30. In combination, a ring disposable over a template; a blow torch receiving hub including a sleeve having a slag deflector at the lower end, said hub being provided with upwardly extending lugs placed around the torch and provided with tapped bores pointing toward the axis of the torch; set screws in said bores having pointed inner ends for engaging and holding torches of different size and shape; two of the screws having bit receiving slots, whereby they may be accurately adjusted, the other set screw having a wrench receiving head for quickly releasing or securing the torch.

31. In combination, a ring disposable over a template and carrying a blow-torch-receiving exteriorly threaded sleeve; a nut on said sleeve; and a coned collar independent of said nut and sleeve on said nut engageable with the template edge.

32. In combination, a ring disposable over a template and carrying a blow-torch-receiving exteriorly threaded sleeve; a nut on said sleeve, upper and lower retaining flanges, the lower flange having wrench receiving faces; and a coned collar on said nut engageable with the template edge.

33. In combination, a ring disposable over a template and carrying a blow-torch-receiving sleeve-like member; having annular grooves therearound to reduce friction and oxidation; and a collar disposed on said member spaced therefrom and engageable with the template.

34. In combination, a ring disposable over a template and carrying a blow-torch-receiving exteriorly threaded sleeve; a nut on said sleeve having a plurality of annular grooves therearound to reduce friction and oxidation; and a collar rotatable on said nut and engageable with the template.

35. In combination, a template having a knife edge; means guided by said edge for carrying a blow-torch.

36. In combination, a template having a template edge having a top bevel; a ring disposable over said template for carrying a blow torch; and bearing balls for said ring engageable with said template and bevel.

37. A template provided with a template edge bounded by upper and lower beveled faces forming a relatively sharp template or guide edge.

38. A template provided with a template opening bounded by a lower beveled face forming a relatively sharp template or guide edge to prevent the adherence of slag such as would cause inaccuracy in the guiding, the lower beveled face deflecting the slag.

39. In combination, a template stand; and a pair of widely separated pointers one of which is horizontally adjustable laterally of a line connecting said pointers.

40. In combination, an enlongated template stand; a finder bar longitudinally slidable in the medial vertical plane of said stand and provided with a finder point in said plane; a horizontally disposed arcuate graduated plate mounted on the rear of said stand concentric with said finder point when the latter is at its forward limit of movement; a downwardly pointing pointer slidable on said plate whereby said stand may be set at a determined angle relative to a line drawn on a work piece, whereby elongated or other non-circular template openings or edges may be set at a determined angle to said line.

41. In combination, including a base; a standard carried on said base; and a template carried by the base and means disposed within the standard and base for elevating the latter.

Signed at New York in the county of New York and State of New York this 9th day of February A. D. 1926.

PAUL ORZEL.